(12) United States Patent  
Ognibene (10) Patent No.: US 11,628,894 B2  
(45) Date of Patent: Apr. 18, 2023

(54) HYDROSTATIC STEERING ARRANGEMENT

(71) Applicant: OGNIBENE POWER S.P.A., Reggio Emilia (IT)

(72) Inventor: Claudio Ognibene, Reggio Emilia (IT)

(73) Assignee: OGNIBENE POWER S.P.A., Reggio Emilia (IT)

(*) Notice: Subject to any disclaimer, the term of this patent is extended or adjusted under 35 U.S.C. 154(b) by 263 days.

(21) Appl. No.: 16/912,748

(22) Filed: Jun. 26, 2020

(65) Prior Publication Data

US 2021/0001930 A1  Jan. 7, 2021

(30) Foreign Application Priority Data

Jul. 1, 2019 (IT) ........................ 102019000010539

(51) Int. Cl.
| | |
|---|---|
| *B62D 49/06* | (2006.01) |
| *B62D 5/04* | (2006.01) |
| *B62D 5/06* | (2006.01) |

(52) U.S. Cl.
CPC ....... *B62D 49/0692* (2013.01); *B62D 5/0463* (2013.01); *B62D 5/062* (2013.01); *G05D 2201/0201* (2013.01)

(58) Field of Classification Search
CPC .. B62D 49/0692; B62D 5/0463; B62D 5/062; G05D 2201/0201
See application file for complete search history.

(56) References Cited

U.S. PATENT DOCUMENTS

| 5,307,892 A * | 5/1994 | Phillips ................... B62D 6/02 |
| | | 91/375 A |
| 2006/0060412 A1 | 3/2006 | Bolourchi et al. |
| 2007/0169471 A1 * | 7/2007 | Rieth ..................... B62D 5/087 |
| | | 60/384 |
| 2016/0332662 A1 | 11/2016 | Porskrog et al. |
| 2020/0114954 A1 * | 4/2020 | Rahimzai ............... B62D 5/062 |
| 2020/0114956 A1 * | 4/2020 | Rahimzai ............... B62D 5/093 |

FOREIGN PATENT DOCUMENTS

| CN | 104176115 A  * | 12/2014 | .......... B62D 5/0463 |
| WO | 2014204925 A1 | 12/2014 | |

OTHER PUBLICATIONS

Mahine translation of CN-104176115-A (Year: 2014).*

* cited by examiner

*Primary Examiner* — Jeff A Burke  
*Assistant Examiner* — Mohamad O El Sayah  
(74) *Attorney, Agent, or Firm* — Volpe Koenig (57) ABSTRACT

A steering arrangement for a vehicle includes:
- a hydrostatic steering unit provided with two work ports, a high-pressure port, a low-pressure port, a main branch of the flow arranged between the work ports and the high-pressure port and comprising a dosing device, and an amplification branch arranged between the work ports and the high-pressure port, in parallel with the dosing device, and comprising a flow-rate regulating device of the electrically actuated type,
- a steering shaft provided with a first end adapted for being connected to a steering member and a second end adapted for being connected to the hydrostatic steering unit,
- an electric motor configured to set the steering shaft in rotation, and
- an electronic control unit configured to actuate the flow-rate regulating device as a function of a parameter indicative of an operating condition of the vehicle.

13 Claims, 3 Drawing Sheets

HYDROSTATIC STEERING ARRANGEMENT

This application claims the benefit of Italian Application No. 102019000010539 filed on Jul. 1, 2019, which is incorporated by reference as if fully set forth.

TECHNICAL FIELD

The present invention relates to a steering arrangement for vehicles, in particular a steering arrangement for farming and/or earth moving vehicles.

BACKGROUND

Current steering arrangements provided with a hydrostatic steering unit and adapted for being installed on vehicles certified both for driving in fields and for driving on public roads require a steering shaft directly connected to a steering member, like for example a steering wheel, and to said hydrostatic steering unit. This is in order to ensure that the driver of the vehicle on which the steering arrangement is installed always has the possibility of carrying out emergency steering, i.e. steering in conditions of insufficient pressure coming from the pump that feeds the circuit in which the hydrostatic steering unit is inserted. In particular, such steering arrangements provide that one end of the steering shaft is configured to set in rotation, for example indirectly through the interposition of elastic elements, a rotor of a dosing device, for example a dosing gearing with internal gears, forming part of the hydrostatic steering unit.

A known type of hydrostatic steering unit comprises two work ports, a high-pressure port, a low-pressure port, a main branch of the flow arranged between the work ports and the high-pressure port and comprising said dosing device, and an amplification branch arranged between the work ports and the high-pressure port, in parallel with the dosing device, and comprising a flow rate regulating valve. Through the amplification branch of the flow rate it is possible to make more fluid reach the work ports, and therefore the chambers of a hydraulic steering actuator cylinder, with respect to what normally arrives through the main branch, thus allowing greater steering angles for the same number of revolutions of the steering shaft and making it possible to recover losses of the work fluid.

The purpose of the present invention is to provide a steering arrangement, of such a type, that is particularly versatile and capable of providing the user with an optimal degree of driving feedback.

Such a purpose is accomplished by the characteristics of the invention given in the independent claim. The dependent claims outline preferred and/or particularly advantageous aspects of the invention.

SUMMARY

The invention, particularly, provides a steering arrangement for a vehicle comprising:
a hydrostatic steering unit provided with two work ports, a high-pressure port, a low-pressure port, a main branch of the flow arranged between the work ports and the high-pressure port and comprising a dosing device, and an amplification branch arranged between the work ports and the high-pressure port, in parallel with the dosing device, and comprising a flow-rate regulating device of the electrically actuated type,
a steering shaft provided with a first end adapted for being connected to a steering member and a second end adapted for being connected to the hydrostatic steering unit,
an electric motor configured to set the steering shaft in rotation, and
an electronic control unit configured to actuate the flow-rate regulating device as a function of a parameter indicative of an operating condition of the vehicle.

Thanks to such a solution a steering arrangement is provided that is particularly versatile thanks to the amplification branch controlled based on the condition of use of the vehicle, which thus makes it possible to selectively reduce, or not, the necessary number of rotations of the steering shaft for the same steering angle, and which thanks to the electric motor installed on the steering shaft makes it possible to provide an optimal driving feedback in all the different operating conditions of the vehicle. Such advantages are further improved in the case in which the electronic control unit is operatively connected to the electric motor and is configured to actuate said electric motor as a function of the parameter indicative of an operating condition of the vehicle.

In particular, one aspect of the invention provides that the flow-rate regulating device can be configured to regulate the flow rate in the amplification branch along a range of flow rate values comprised between a minimum flow rate value in the amplification branch and a maximum flow rate value in the amplification branch, and the electronic control unit is configured to actuate the flow-rate regulating device within said range as a function of a parameter indicative of an operating condition of the vehicle.

Another aspect of the invention provides that the electronic control unit can be configured to actuate the electric motor as a function of the parameter indicative of an operating condition of the vehicle so as to provide a haptic feedback to the user through a torque generated on the steering shaft.

In this way the comfort or the driving precision is improved depending on the conditions of use of the vehicle.

Yet another aspect of the invention provides that the steering arrangement can comprise a rotation sensor configured to measure a parameter indicative of a rotation angle of the steering shaft and in which the electronic control unit is configured to actuate the electric motor as a function of the parameter indicative of an operating condition of the vehicle and as a function of said parameter indicative of a rotation angle of the steering shaft, so as to provide a haptic feedback to the user through a torque generated on the steering shaft.

In this way, the steering arrangement is particularly quick in providing the driver with the best driving sensations based on the condition of use.

A further aspect of the invention provides that the electronic control unit can be configured to select, as a function of the parameter indicative of an operating condition of the vehicle, a management algorithm among a plurality of management algorithms of the ratio between the flow rate that passes through the amplification branch and the flow rate that passes through the main branch, and to actuate the flow-rate regulating device according to said management algorithm.

This aspect ensures a particular versatility of the vehicle, i.e. efficiency and driving comfort in different situations.

According to an aspect of the invention, said plurality of management algorithms can comprise a management algorithm in which the flow-rate regulating device is actuated to change the flow rate in the amplification branch within a sub-range, of the total range of the flow-rate regulating device, having an extension of 9/10 of the total range and comprising the maximum flow rate value in the amplification branch.

Alternatively, the sub-range range can be defined as comprised between 0.1 and 1 times the maximum flow rate value.

In this way it is possible to reduce the number of rotations of the steering shaft with respect to the desired steering angle making driving less tiring. Such an advantage can be further improved in the case in which, when the electronic control unit actuates the flow-rate regulating device according to such a management algorithm, the electronic control unit is configured to actuate the electric motor so as to generate a torque on the steering shaft, for example comprised between 0.2 Nm and 4 Nm, oriented in the same direction of rotation in which the user actuates the steering member.

Moreover, in a case of automatic driving of the vehicle carried out by actuating the steering shaft through the electric motor to drive the vehicle along a predetermined path, such aspects of the invention make it possible to decrease the number of rotations of the steering wheel in a unit time, thus increasing the safety for the user of the vehicle. In particular, a steering member comprising a steering wheel can rotate at a speed of 150 revs per minute when steering is carried out through the electric motor in automatic driving conditions and with the entire flow that flows in the main branch of the hydrostatic steering unit. By actuating the regulating device in the sub-range described above, it is possible to reduce the number of revs per minute of the steering wheel by a factor close to the ratio between the maximum flow rate that can flow in the amplification branch and the flow rate that flows in the main branch, said ratio being defined by the configuration of the hydrostatic steering unit. For example, the hydraulic steering unit can be configured so that such a ratio can be comprised between 1.5 and 5, preferably such a ratio is comprised between 2 and 3.5. Therefore, it is clear that there is increased safety for the user.

According to another aspect of the invention said plurality of management algorithms can comprise a management algorithm in which the flow-rate regulating device is actuated within a sub-range of the total range of the flow-rate regulating device having extension comprised between 4/10 and 5/10 of the total range and comprising the minimum flow rate value in the amplification branch.

Alternatively, the sub-range range can be defined as comprised between 0 and 0.5 times the maximum flow rate value in the amplification branch, preferably between 0 and 0.4 times the maximum flow rate value in the amplification branch.

In this way it is possible to increase the driving feedback, i.e. to decrease the sensitivity of the steering arrangement to the commands imparted by the user, in the case of driving on the road. This is since by reducing the amount of flow in the amplification branch, a greater rotation angle of the steering shaft is necessary to impart a steering command, which makes it possible to increase the driving precision. Such an advantage can be further improved in the case in which, when the electronic control unit actuates the flow-rate regulating device according to the management algorithm, the electronic control unit is also configured to actuate the electric motor so as to generate a torque, for example comprised between 0 N and 4 Nm, on the steering shaft, oriented in an opposite direction of rotation with respect to that in which the user actuates the steering member.

According to yet another aspect of the invention, the steering arrangement can comprise a sensor operatively connected to the electronic control unit and configured to detect the parameter indicative of the operating condition of the vehicle and in which the electronic control unit is configured to automatically actuate the flow-rate regulating device as a function of the parameter detected by the sensor.

Thanks to such a characteristic it is possible to automate the selection process of the operating condition of the vehicle, increasing driving comfort and allowing the operator to concentrate on driving the vehicle and on actuating the possible work tools connected to the vehicle, all of which benefits safety.

The invention also provides a vehicle comprising:
- a steering arrangement according to any one of the previous claims,
- a pair of steered wheels
- a rotation sensor configured to measure a parameter indicative of a rotation angle of the steering shaft
- a steering sensor configured to measure a parameter indicative of a steering angle of the steered wheels.

wherein the electronic control unit is operatively connected to the steering sensor and to the rotation sensor and is configured to actuate the flow rate regulating device as a function of a parameter indicative of an operating condition of the vehicle and of the ratio between the rotation angle of the steering shaft and the steering angle of the steered wheels.

Thanks to such a solution a vehicle is provided that is particularly versatile, safe and comfortable in driving.

According to an aspect of the invention, the electronic control unit can comprise a relationship algorithm such that each steering angle value of the steered wheels corresponds to a rotation angle value of the steering shaft, and is configured to compare the value of the parameter indicative of the steering angle of the steered wheels with the value of the parameter indicative of a rotation angle of the steering shaft and, when the comparison (for example in the form of a ratio or difference) between such parameters returns a value that differs with respect to the relationship values between angles defined by the relationship algorithm, is configured to actuate the flow-rate regulating device so as to change the flow rate that flows in the amplification branch until the comparison of the value of the parameter indicative of the steering angle of the steered wheels with the value of the parameter indicative of a rotation angle of the steering shaft returns the value provided by the relationship algorithm.

Thanks to such a solution it is possible to always have the steering wheel in phase with the steered wheels. In particular this makes it possible to make the steering wheel always go back to the same reference position when the steering angle is equal to zero, i.e. the vehicle is proceeding on a rectilinear trajectory. In turn, such an advantage makes it possible to install a plurality of controls on the steering wheel, for example levers or buttons, to control the vehicle.

An aspect of the invention provides that the electronic control unit can be configured to actuate the electric motor so as to drive the vehicle along a predetermined path and to actuate the flow-rate regulating device so that the flow rate value in the amplification branch is around the maximum value, when the electronic control unit actuates the electric motor to drive the vehicle along the predetermined path.

In this way the vehicle is particularly comfortable and safe in autonomous driving conditions, with respect to the devices of the prior art provided with a steering shaft directly connected to the hydrostatic steering unit. In particular, in such an autonomous driving condition it is the electric motor that sets the steering shaft in rotation, i.e. it rotates without control by the user also setting the steering member in rotation, like for example a steering wheel. By reducing the number of revolutions per unit time of the steering shaft thanks to the amplification branch, it is clear how this increases the safety of the user.

In particular, the vicinity of the maximum value can for example be defined as a sub-range comprised between 0.4 and 1 times the maximum flow rate value in the amplification branch, preferably as a sub-range comprised between 0.5 and 1 times the maximum flow rate value in the amplification branch.

BRIEF DESCRIPTION OF THE DRAWINGS

Further characteristics and advantages of the invention will become clear from reading the following description provided as a non-limiting example, with the help of the figures illustrated in the attached tables.

DETAILED DESCRIPTION OF THE PREFERRED EMBODIMENTS

With particular reference to such figures, a self-propelled vehicle, in particular a heavy vehicle adapted for moving at low speed (typically below 60 km/h), like for example a farming tractor or an earth moving machine has been globally indicated with 1, said vehicle being provided with a pair of steered wheels 5 adapted for being actuated through a steering arrangement 10.

The steering arrangement 10 can comprise a steering actuator connected to the steered wheels 5 to control the steering thereof. For example, the steering actuator comprises a double-acting hydraulic cylinder 15, which is provided with a plunger 20 that divides the internal volume of the cylinder into two separate chambers 25 and 30. The plunger 20 comprises two opposite stems, which project outside of the cylinder 15 and are mechanically connected to respective lever mechanisms 35, 40 of the steered wheels 5 of the vehicle. In this way, every movement of the plunger 20 in one direction or in the opposite direction, corresponds to a different steering angle of the steered wheels 5.

The steering arrangement can comprise a pump 45, for example a positive displacement pump actuated by a motor of the vehicle 1, which is adapted for taking oil from a tank 50.

The steering arrangement 10 comprises a steering member adapted for being manipulated by a user of the vehicle to impart a steering command, for example such a steering member comprises a steering wheel 55. However, this does not rule out the possibility in an alternative embodiment of the steering member being able to comprise a joystick.

The steering arrangement comprises a steering shaft 60, which comprises a first end rotating as a unit with the steering member, i.e. with the steering wheel 55, and a second end adapted for being directly connected to a hydrostatic steering unit 65.

The hydrostatic steering unit 65 comprises a high-pressure port 70, adapted for being connected to a pressurized fluid source, a low-pressure port 75 adapted for being connected to the tank 50, and two work ports 80 and 85, each adapted for being connected to a respective chamber 25, 30 of the double-acting hydraulic cylinder. For example, the ports described here are made in an external body of the hydrostatic steering unit.

The hydrostatic steering unit comprises a dosing device 90. The dosing device is for example configured like a dosing gearing with internal gears. The dosing device is for example configured like a geared positive displacement pump, commonly called gerotor, which comprises an inner toothed wheel that meshes with an outer crown gear, wherein the toothed wheel is slightly offset with respect to the crown gear.

The dosing device 90 is directly controlled by the steering shaft 60, i.e. by the second end thereof. In particular, the second end of the steering shaft sets the inner toothed wheel in rotation, for example through the interposition of at least one elastic element. In particular, the second end of the steering shaft rotates rigidly as a unit with an input shaft of the hydrostatic steering unit, which sets the inner toothed wheel in rotation through the interposition of at least one elastic element.

The dosing device 90 is preferably housed inside the outer body of the hydrostatic steering unit.

Figure 3:
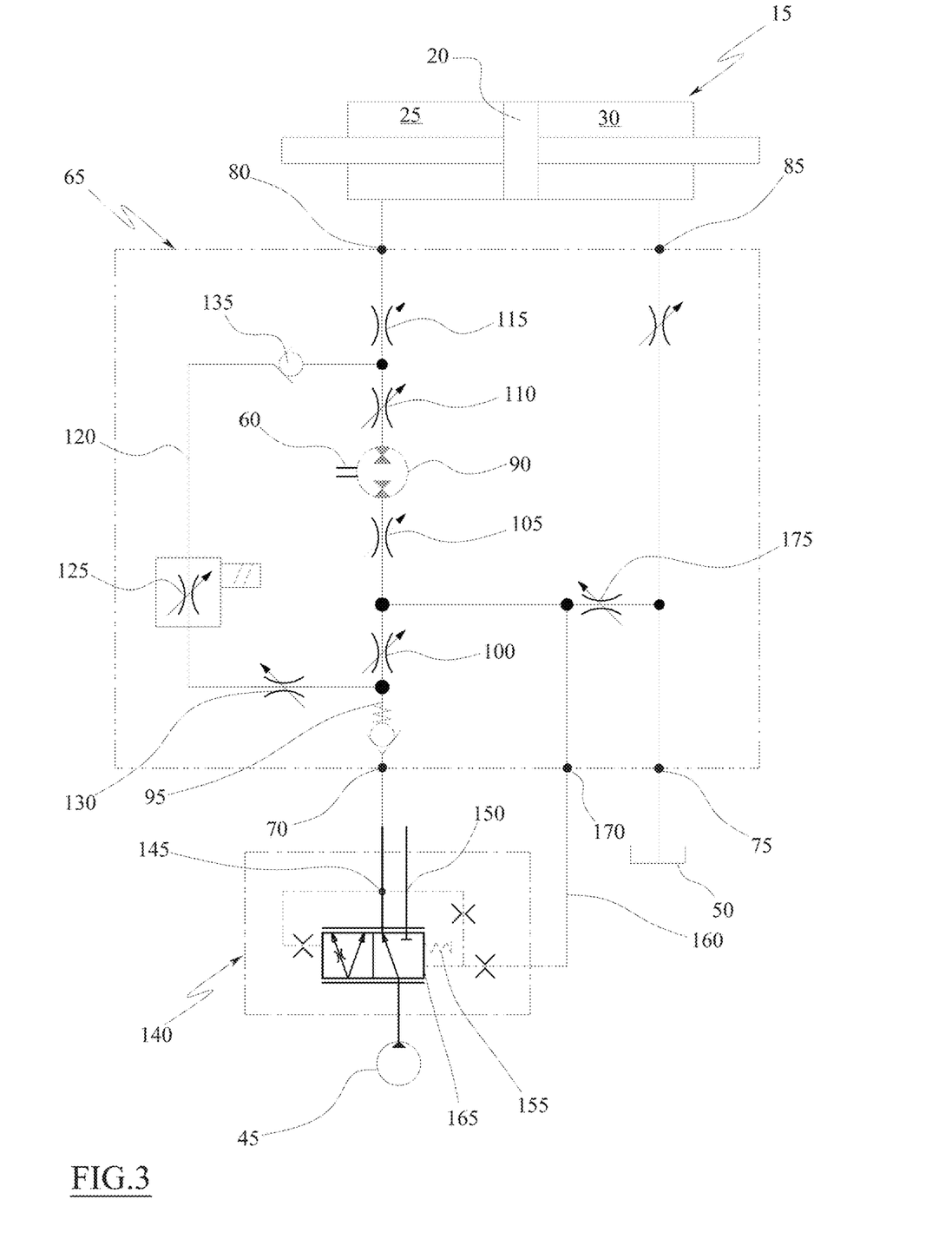
FIG. 3 is a schematic diagram of the steering unit of FIG. 2 in which a steering condition of the vehicle is represented.

With particular reference to FIG. 3, the hydrostatic steering unit comprises a main flow branch 95 that goes from the high-pressure port 70 to the work ports and comprises the dosing device.

Figure 1:
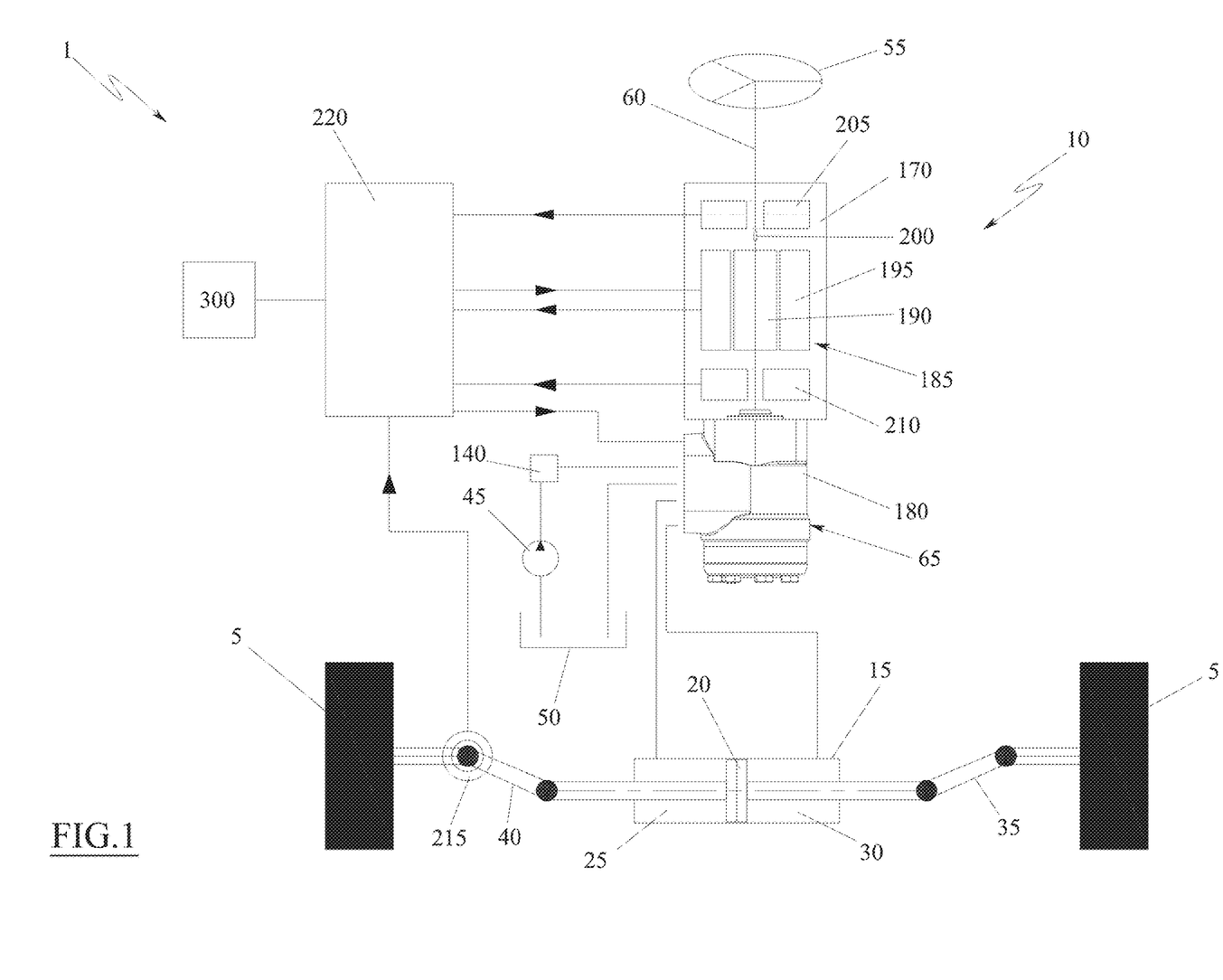
FIG. 1 is a functional diagram of a vehicle according to the invention provided with a steering arrangement.

As schematized in FIG. 1, when in steering conditions the main branch 95 comprises four variable orifices 100, 105, 110, 115 the first two of which are upstream of the dosing device 90 with respect to the direction of the flow entering the high-pressure port 70, and in series with one another, and the second two of which are downstream of the dosing device 90, and in series with one another, with respect to the direction of the flow entering the high-pressure port 70.

The steering unit also comprises an amplification branch of the flow rate 120 adapted to put the work ports 80,85 in communication with the high-pressure port 70 bypassing the dosing device 90.

The amplification line 120 is equipped with a flow-rate regulating device, of the electrically actuated type, configured to change the flow rate in the amplification branch of the flow rate 120 within a (single and continuous) range of flow rate values comprised between a minimum value, wherein for example the value of the flow rate that flows in the amplification branch is zero, and a maximum value, wherein for example the value of the flow rate that flows in the amplification branch is comprised between 1.5 and 5 times the flow rate that flows in the main branch 95, preferably between 2 and 3.5 times.

In the illustrated embodiment, the flow-rate regulating device comprises a flow rate regulating valve 125, of the electrically actuated type, which is substantially a hydraulic device configured to change the passage area available for a flow that passes through it.

The flow-rate regulating device is in fluid communication with the high-pressure port, in particular through the interposition of an amplification orifice 130, and with the work ports, in particular through a non-return valve 135.

In particular, the amplification branch of the flow rate intercepts the main branch of the flow in an intersection arranged between the high-pressure port 70 and the variable orifice 100, which is the first variable orifice after the high-pressure port encountered by the flow that moves towards the dosing device 90.

The steering arrangement 10 can comprise a priority flow rate valve 140, which is arranged between the pump 45 and the high-pressure port 70 of the steering unit 65. In particular, the priority valve comprises a first outlet mouth 145 connected to the high-pressure port 70 and a second outlet mouth 150 in communication with some secondary users of the vehicle on which the steering arrangement is installed.

The priority flow rate valve 140 comprises a spring 155 adapted to keep a slide of the valve in the position in which the entire flow rate is sent to the first outlet mouth 145.

The priority valve 140 is in communication through a load sensing line 160 with the steering unit 1. In particular, the load sensing line 160 comprises a first mouth 165, in communication with a chamber of the priority valve that contains the spring 155, and a second mouth 170 in communication with the low-pressure port 75, through the interposition of an orifice 175, and in communication with the main line, in particular with a portion of such a main line arranged between the first two variable orifices 100, 105 upstream of the dosing device 90 with respect to the direction of the flow from the high-pressure port to the work ports.

The load sensing line 160 is in fluid communication with the first outlet mouth 150 through the interposition of a fixed throttling. Moreover, the load sensing line 160 has a fixed throttling arranged between the connection point with the first outlet mouth 155 and the second mouth 170.

The hydrostatic steering unit 65 is configured so that, when the steering member, i.e. on the steering wheel 55, is not acted upon to carry out steering, the variable orifice 175 that connects the load sensing line 160 to the low-pressure port, is open, therefore the load sensing line is arranged for discharging, whereas the variable orifices 100 and 130 are closed and consequently the pressurized fluid coming from the priority valve does not reach the dosing device 90 and the work ports 80,85. When a steering command reaches the steering unit 65, the variable orifice 175 progressively closes whereas at the same time the variable orifices 100 and 130 open.

The variable orifice 175 can be configured to completely close before the opening of the variable orifices 100 and 130, or it can be configured to partially overlap the variable orifices going to close before the complete opening of the variable orifices 100 and 130.

Figure 2:
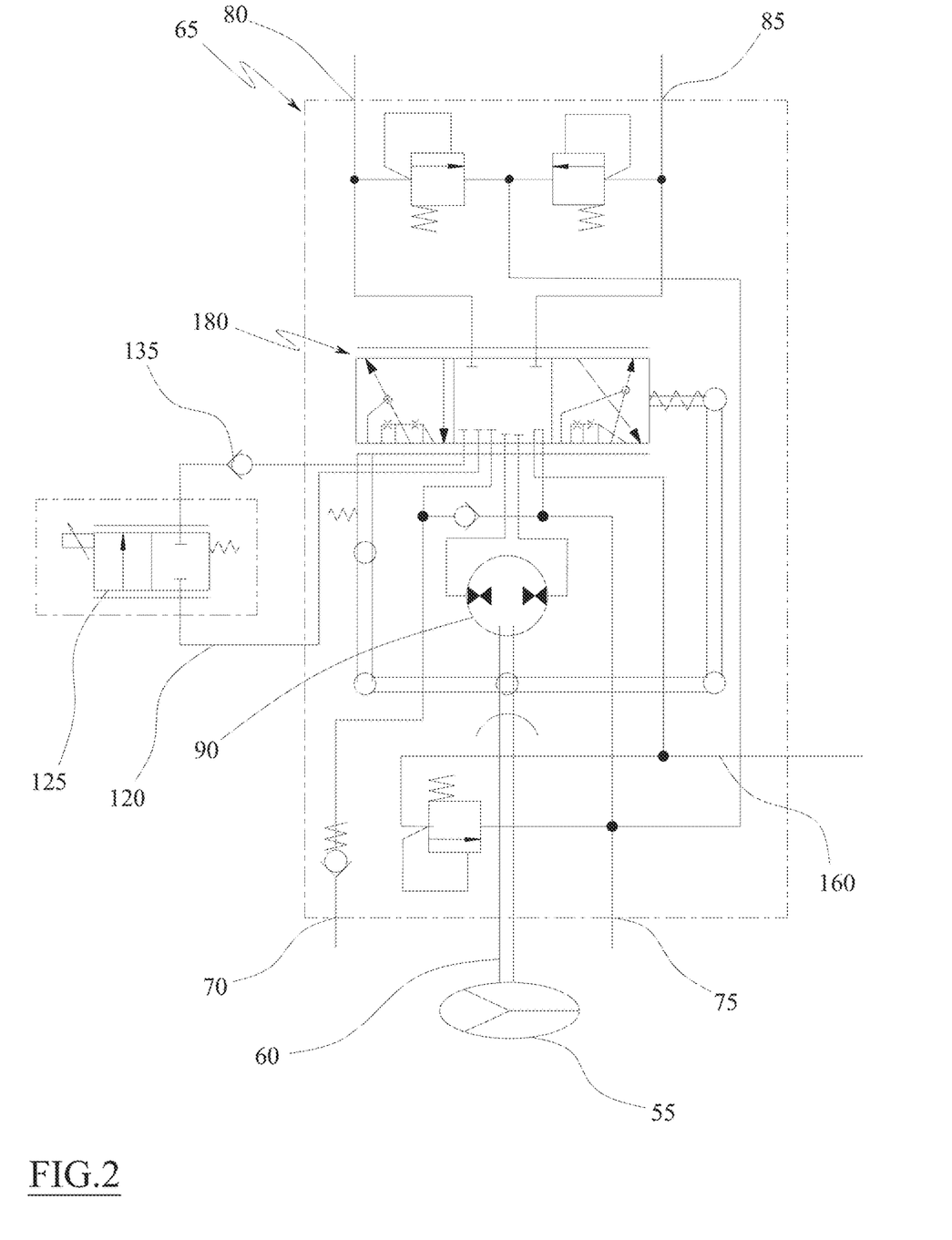
FIG. 2 is a schematic diagram of a steering unit of the steering arrangement.

In the illustrated embodiment, the steering unit comprises a rotary distributor 180 (schematically represented in FIG. 2 as a linear distributor) equipped with a rotary arrangement, rotatably received inside the outer body, which is provided with two cylinders coaxially inserted into one another (not illustrated in the figures), an inner cylinder of which is set in rotation by the steering shaft, for example through the interposition of at least one elastic element, and in which respective through holes are made that in combination with each other define the variable orifices described above.

The inner cylinder, in particular, is connected through at least one elastic element to the input shaft of the steering unit and is set in rotation by it. The inner cylinder also rotates rigidly as a unit with the inner toothed wheel of the dosing positive displacement pump.

When the steering member is stationary, the outer cylinder of the distributor is in a neutral position with respect to the inner cylinder, such that the pressurized oil is blocked by the first variable orifice at the inlet of the steering unit.

At the moment when the steering member is actuated in one of the two directions, the inner cylinder of the distributor carries out a small rotation with respect to the outer cylinder and goes into a first operative position in which the first chamber of the double-acting cylinder is connected with the tank, whereas the second chamber is connected with the delivery of the pump through the dosing.

In this way, continuing to rotate the steering member in the same direction, the dosing device transfers an amount of pressurized oil to the second chamber that is proportional to the rotation carried out by the inner toothed wheel of the gerotor and thus of the steering member, thus actuating the plunger of the double-acting cylinder in the direction of proportionally changing the steering angle of the wheels.

When the steering member is stopped, the outer cylinder of the distributor goes back into neutral position by means of suitable spring systems, so as to stop the steered wheels in the configuration reached.

By reversing the direction of rotation of the steering member, the operation of the driving unit is the same, with the sole difference that the inner cylinder of the distributor goes into a second operative position such as to connect the second chamber of the double-acting cylinder with the tank and the first chamber with the delivery of the pump (again through the dosing device), allowing a movement of the steered wheels in the opposite direction to the previous one.

With particular reference to FIG. 1, the steering arrangement 10 also comprises an electric motor 185, for example a direct current motor, preferably a brushless motor, which is configured to set the steering shaft in rotation with respect to a rotation axis of the steering shaft itself. Preferably, the steering arrangement comprises only the electric motor 185 to set the steering shaft 60 in rotation.

In particular, the electric motor 185 comprises an annular rotor 190, to which the permanent magnets or the electrical rotor windings of the motor are directly applied. The annular rotor 190 is directly and coaxially inserted on the steering shaft 60 and is constrained, for example through fitting or through an interference coupling, in rotation with it, preferably it is constrained in rotation at the second end.

The electric motor 185 also comprises an annular stator 195, to which the electrical stator windings of the motor are directly applied. The annular stator 195 coaxially surrounds the rotor 190.

The steering arrangement can comprise a rotation sensor adapted for detecting the angle of rotation of the steering shaft with respect to an angular reference position, i.e. adapted for detecting a parameter indicative of a rotation angle of the steering shaft with respect to a reference position.

For example, the rotation sensor comprises a torque meter.

In the illustrated embodiment, the steering shaft is equipped with two segments, a first segment of which comprises the first end and a second segment of which comprises the second end, and the torque meter comprises a torsion bar 200 (schematically represented), adapted for directly connecting in rotation the first segment and the second segment. Furthermore, the torque meter comprises a sensor apparatus configured to detect an angular offsetting between the two segments of the steering shaft, i.e. it comprises a first angular sensor 205 configured to measure the angular position of the first segment of the steering shaft 60 and a second angular sensor 210 configured to measure the angular position of the second segment of the steering shaft. Through the elastic characteristic of the torsion bar it is also possible to determine the torque applied to the input shaft.

The vehicle can also comprise a steering sensor 215 configured to detect a steering angle of the vehicle, i.e. to detect a steering angle of the steered wheels with respect to a reference direction along which the vehicle moves along a straight line.

The sensor can be configured to detect a linear movement of the stem of the steering actuator and/or to detect a rotation angle of a lever mechanism through which the steered wheels are connected to the stem of the steering actuator.

The steering arrangement 10 comprises an electronic control unit 220 operatively connected to the flow-rate regulating device and configured to actuate the flow-rate regulating device, i.e. the flow rate regulating valve 125, as a function of a parameter indicative of an operating condition of the vehicle.

In particular, the electronic control unit is configured to actuate the flow-rate regulating device within the range of flow rates of the flow-rate regulating device itself, preferably (only) within a sub-range of the total actuation range of the flow-rate regulating device, as a function of the parameter indicative of an operating condition of the vehicle.

The parameter indicative of the operating condition can be at least one among an input provided by a manual interface device, for example comprising a keypad and/or a control station equipped with a display interface, and a value of a parameter indicative of an operating condition of the vehicle measured by a sensor of the vehicle.

For example, the input provided by the manual interface device can be at least one among a field driving input, a road driving input and an automatic field driving input in which the electronic control unit actuates the electric motor to drive the vehicle along a predetermined path.

The electronic control unit can comprise or be operatively connected to a memory unit in which a plurality of management algorithms of the flow rate regulating device is stored and can be configured to select, as a function of the parameter indicative of the operating condition of the vehicle and/or of a value of the parameter indicative of the operating condition of the vehicle received, a corresponding management algorithm among the plurality of management algorithms and to actuate the flow-rate regulating device according to the selected corresponding management algorithm.

Such a plurality of management algorithms comprises a first management algorithm in which the flow-rate regulating device is actuated (only) within a (continuous) sub-range of the range of the flow-rate regulating device having extension of 9/10 of the total range and that comprises the maximum flow rate value in the amplification branch.

The plurality of management algorithms also comprises a second management algorithm in which the flow-rate regulating device is actuated (only) within a (continuous) sub-range of the range of the flow-rate regulating device having extension comprised between 4/10 and 5/10 of the total range and comprising the minimum flow rate value in the amplification branch, preferably 4/10 of the total range, and which comprises the minimum flow rate value in the amplification branch.

Preferably, the electronic control unit is operatively connected to the electric motor 185 and is configured to actuate said electric motor as a function of the parameter indicative of an operating condition of the vehicle so as to change the intensity of a haptic feedback provided to whoever actuates the steering member through the generation of a torque on the steering shaft.

In particular, such a haptic feedback is configured as a decrease or increase in the torque to be applied to the steering member to impart a steering command by a user. In other words, it is configured as a decrease or increase in the torque to be applied to the steering member to impart a steering command with respect to the torque necessary to overcome the torque generated on the steering shaft by the elastic element arranged between the rotor of the dosing element and the steering shaft, i.e. the elastic element arranged between the inner cylinder and the input shaft of the steering unit.

The management algorithms can thus be configured to manage the electric motor 185 so as to change the intensity of the haptic feedback provided to whoever actuates the steering member through a torque generated on the steering shaft.

In particular, the first management algorithm also provides for the electronic control unit to actuate, in response to the actuation of the steering member by a user, the electric motor 185 so that it generates a torque on the steering shaft, oriented in the same direction of rotation in which the user actuates the steering member, i.e. in the same direction of rotation in which the user wishes to set the steering shaft in rotation.

In this way, the actuation of the steering member is less tiring in the work conditions of the vehicle, i.e. field driving.

Furthermore, the second management algorithm provides for the electronic control unit to actuate, in response to the actuation of the steering member by a user, the electric motor 185 so that it generates a torque on the steering shaft oriented in an opposite direction of rotation with respect to the one in which the user actuates the steering member, i.e. in an opposite direction of rotation with respect to the one in which the user wishes to set the steering shaft in rotation.

In this way, the actuation of the steering member is more precise in the transportation conditions of the vehicle, i.e. driving on the road.

Both of the algorithms provide for the torque exerted by the electric motor to be substantially comprised between a zero torque and a torque at least equal to that generated on the steering shaft by the elastic element arranged between the rotor of the dosing element and the steering shaft. For example, such a torque is comprised between 0 Nm and 4 Nm, preferably between 0 Nm and 3 Nm.

In addition, the electronic control unit can be configured to actuate the electric motor to provide a haptic feedback to the user through the generation of a torque on the steering shaft also as a function of the parameter indicative of a rotation angle of the steering shaft.

In particular, in this way it is possible to precisely supply the electric motor with the direction in which to generate the torque on the steering shaft to provide the haptic feedback.

The electronic control unit is configured to select the first management algorithm when the parameter indicative of the operating condition of the vehicle corresponds to a driving condition of the vehicle in a field.

The electronic control unit is configured to select the first management algorithm when the parameter indicative of the operating condition of the vehicle corresponds to an automatic driving condition of the vehicle in a field, wherein the electronic control unit, by actuating the electric motor, drives the vehicle along a predetermined path.

The electronic control unit is configured to select the second management algorithm when the parameter indicative of the operating condition of the vehicle is a transportation condition of the vehicle, i.e. a road driving condition of the vehicle, for example on a public road.

For example, the vehicle can comprise a sensor 300, or a plurality of sensors, configured to detect a parameter indicative of the operating condition of the vehicle.

A first sensor can, for example, comprise an inertial platform (not illustrated) adapted for measuring the instantaneous accelerations of the vehicle on at least three mutually perpendicular axes. When the value of the measured accelerations, for example in a predetermined time period, is below a predetermined value, the signal generated by the inertial platform towards the electronic control unit constitutes a parameter indicative of the operating condition of the vehicle when driving on the road. When the value of the accelerations above a predetermined value, the signal generated by the inertial platform towards the electronic control unit constitutes a parameter indicative of the operating condition of the vehicle when driving in a field.

Alternatively or additionally, the vehicle can comprise a sensor configured to measure a parameter indicative of the speed of movement of the vehicle, for example a speedometer. When the measured speed value, for example in a predetermined time period, is above a predetermined threshold value, the signal generated by the movement speed sensor of the vehicle constitutes a parameter indicative of the operating condition of the vehicle when driving on the road. When the measured speed value is below a predetermined threshold value, the signal generated by the movement speed sensor of the vehicle constitutes a parameter indicative of the operating condition of the vehicle when driving in a field.

The electronic control unit can also be configured to actuate the flow-rate regulating device within its range of flow rates, in all of the operating conditions described earlier, also as a function of the ratio between the rotation angle of the steering shaft and the steering angle of the steered wheels.

This is so as to correct steering angle errors due to losses or leaks in the hydraulic circuit.

For example, in addition or alternatively to what has been stated up to now concerning the configurations of the electronic control unit 220, the electronic control unit can comprise a relationship algorithm such that each steering angle value of the steered wheels corresponds to a value, i.e. a single value, of the rotation angle of the steering shaft, and can be configured to compare the value of the parameter indicative of the steering angle of the steered wheels 5 with the value of the parameter indicative of a rotation angle of the steering shaft 60. When such a comparison, which can for example provide for carrying out a difference or a ratio between such angular values or measured parameters, returns a value that differs from the relationship values between angles defined by the relationship algorithm, the electronic control unit is configured to actuate the flow-rate regulating device 125, for example only the flow-rate regulating device 125, so as to change the flow rate that flows in the amplification branch until the comparison of the value of the parameter indicative of the steering angle of the steered wheels 5 with the value of the parameter indicative of a rotation angle of the steering shaft 60, i.e. with the respective angular values corresponding to the values of the indicative parameters, returns the value provided for by the relationship algorithm.

Said relationship algorithm provides that, when the steering angle is equal to zero, or around 0° (possibly with a tolerance of +/−2°), thus the vehicle is moving on a rectilinear trajectory, the rotation angle of the steering shaft is equal to zero, or is around 0° (possibly with a tolerance of +/−2°) with respect to a predetermined angular reference position.

Such a predetermined angular reference position is such that the steering wheel is substantially centered, or aligned, with the steered wheels when the steering angle is equal to, or around, zero.

Furthermore, when the electronic control unit is configured to actuate the flow-rate regulating device according to the relationship algorithm, the electronic control unit is also configured to simultaneously actuate the electric motor to provide the haptic feedback and/or to actuate the electric motor according to the first algorithm or the second algorithm. Moreover, the electric motor is not actuated to change the rotation angle of the steering shaft to put the steered wheels in phase with the steering wheel, i.e. the electronic control unit is not configured to actuate the electric motor to rotate the steering shaft until the comparison of the parameter indicative of the steering angle of the steered wheels 5 with the parameter indicative of a rotation angle of the steering shaft 60 returns the value provided for by the relationship algorithm.

It should be specified that such a configuration of the electronic control unit 220 can be additional or alternative to the fact that the electronic control unit is configured to actuate the flow-rate regulating device as a function of a parameter indicative of an operating condition of the vehicle. Furthermore, such a function is available when manual driving of the vehicle is selected, i.e. it is not available when automatic driving of the vehicle is selected.

As stated earlier, the electronic control unit 220 can be configured to actuate the electric motor 185 so as to drive the vehicle along a predetermined path, for example stored in a storage device.

For example, the electronic control unit can comprise a GPS receiver (not illustrated) and can be configured to actuate the electric motor 185 so as to drive the vehicle along the predetermined path based on a parameter indicative of the position of the vehicle received by the GPS receiver.

When the electronic control unit 220 actuates the electric motor 185 so as to drive the vehicle along the predetermined path, it also actuates the flow-rate regulating device in a (continuous) sub-range of the range of the flow-rate regulating device having extension comprised between 5/10 and 6/10 of the total range, preferably 5/10 of the total range, and comprising the maximum flow rate value in the branch.

Alternatively, such a sub-range can be defined as a sub-range comprised between 0.4 and 1 times the maximum flow rate value in the amplification branch, preferably as a sub-range comprised between 0.5 and 1 times the maximum flow rate value in the amplification branch In other words, in such a condition the actuation command of the electric motor imparted by the electronic control unit to drive the vehicle along the predetermined path constitutes a parameter indicative of the operating condition of the vehicle that corresponds to the first management algorithm.

The operation of the vehicle according to the invention is as follows.

When a user must drive the vehicle in a field, i.e. in a field to be farmed, for example to carry out the ploughing of said field, he/she can, for example through the manual interface device, send the parameter indicative of the operating condition of the vehicle corresponding to driving in a field to the electronic control unit. In this case the electronic control station actuates the flow-rate regulating device, and for example also the electric motor, according to the first management algorithm. In the case in which the vehicle is provided with the sensor adapted for measuring a parameter indicative of the operating condition of the vehicle, such an operation is carried out automatically by the electronic control station.

At the moment when the flow-rate regulating device and the electric motor are actuated according to the first management algorithm, the user needs a few revolutions to carry out the steering of the vehicle and the response of the steering wheel is particularly soft.

When the user must drive the vehicle on the road, for example an asphalt or gravel road, he/she can, for example through the manual interface device, send the parameter indicative of the operating condition of the vehicle corresponding to driving in a field to the electronic control unit. In this case the electronic control station actuates the flow-rate regulating device, and for example also the electric motor, according to the first management algorithm. Also in this case, if the vehicle is provided with the sensor adapted for measuring a parameter indicative of the operating condition of the vehicle, such an operation is carried out automatically by the electronic control station.

If the flow-rate regulating device and the electric motor are actuated according to the second management algorithm, the user, in order to carry out the steering of the vehicle, needs to make the revolutions provided for to allow the entire flow to pass through the main branch and the dosing device. Therefore, the response of the steering wheel is particularly precise and stable.

When the user actuates the electronic control unit so that it actuates the vehicle in the autonomous driving condition, the electronic control unit automatically actuates the flow-rate regulating device according to the first algorithm. In such a condition the steering wheel rotates as a consequence of the torque applied by the electric motor on the steering shaft, but thanks to the actuation of the flow-rate regulating device according to the first algorithm, the number of revolutions carried out per unit time by the steering wheel are substantially decreased with respect to the case in which the regulating device is not actuated according to the first algorithm.

The invention thus conceived can undergo numerous modifications and variants all of which are encompassed by the inventive concept.

Moreover, all of the details can be replaced by other technically equivalent elements.

In practice, the materials used, as well as the contingent shapes and sizes, can be whatever according to requirements without for this reason departing from the scope of protection of the following claims.

The invention claimed is:

1. A steering arrangement (10) for a vehicle (1) comprising:
    a hydrostatic steering unit (65) provided with two work ports (80,85), a high-pressure port (70), a low-pressure port (75), a main branch of the flow (95) arranged between the work ports (80,85) and the high-pressure port (70) and comprising a dosing device (90), and an amplification branch (120) arranged between the work ports and the high-pressure port, in parallel to the dosing device, and comprising a flow-rate regulating device (125) of the electrically actuated type,
    a steering shaft (60) provided with a first end adapted for being connected to a steering member (55) and a second end adapted for being connected to the hydrostatic steering unit (65),
    an electric motor (185) configured to set the steering shaft (60) in rotation, and
    an electronic control unit (220) configured to actuate the flow-rate regulating device (125) as a function of a parameter indicative of an operating condition of the vehicle.

2. The steering arrangement (10) according to claim 1, wherein the flow-rate regulating device (125) is configured to regulate the flow rate in the amplification branch (120) within a range of flow rate values comprised between a minimum flow rate value in the amplification branch and a maximum flow rate value in the amplification branch, and the electronic control unit (220) is configured to actuate the flow-rate regulating device (125) along said range as a function of a parameter indicative of an operating condition of the vehicle (1).

3. The steering arrangement (10) according to claim 1, wherein the electronic control unit (220) is configured to actuate the electric motor (185) as a function of the parameter indicative of an operating condition of the vehicle (1) so as to provide a haptic feedback to the user through a torque generated on the steering shaft (60).

4. The steering arrangement (10) according to claim 3, further comprising a rotation sensor configured to measure a parameter indicative of a rotation angle (200,205,210) of the steering shaft (60) and wherein the electronic control unit (220) is configured to actuate the electric motor (185) as a function of the parameter indicative of an operating condition of the vehicle (1) and as a function of said parameter indicative of a rotation angle of the steering shaft (60), so as to provide a haptic feedback to the user through a torque generated on the steering shaft (60).

5. The steering arrangement (10) according to claim 1, wherein the electronic control unit (220) is configured to select, as a function of the parameter indicative of an operating condition of the vehicle (1), a management algorithm among a plurality of management algorithms of the ratio between the flow rate that passes through the amplification branch (120) and the flow rate that passes through the main branch (95), and to actuate the flow-rate regulating device (125) according to said management algorithm.

6. The steering arrangement (10) according to claim 5, wherein said plurality of management algorithms comprises a management algorithm in which the flow-rate regulating device (125) is actuated to change the flow rate in the amplification branch (120) within a sub-range, of the total range of the flow-rate regulating device (125), having extension of $9/10$ of the total range and comprising the maximum flow rate value in the amplification branch (120).

7. The steering arrangement (10) according to claim 6, wherein when the electronic control unit actuates the flow-rate regulating device according to said management algorithm, the electronic control unit is configured to actuate the electric motor so as to generate a torque on the steering shaft oriented in the same direction of rotation in which the user actuates the steering member.

8. The steering arrangement (10) according to claim 5, wherein said plurality of management algorithms comprises a management algorithm in which the flow-rate regulating device (125) is actuated within a sub-range of the total range of the flow-rate regulating device (125) having extension comprised between $4/10$ and $5/10$ of the total range and comprising the minimum flow rate value in the amplification branch (120).

9. The steering arrangement (10) according to claim 1, wherein the parameter indicative of the operating condition can be at least one among an input provided by a manual interface device and a value of a parameter indicative of an operating condition of the vehicle measured by a sensor of the vehicle, said sensor being one between an inertial platform adapted for measuring the instantaneous accelerations of the vehicle on at least three mutually perpendicular axes and a sensor configured to measure a parameter indicative of the speed of movement of the vehicle, wherein said sensor (300) is operatively connected to the electronic control unit (220) and is configured to detect the parameter indicative of the operating condition of the vehicle (1) and in which the electronic control unit (220) is configured to automatically actuate the flow-rate regulating device (125) as a function of the parameter detected by the sensor.

10. The steering arrangement (10) according to claim 9, wherein when the electronic control unit actuates the flow-rate regulating device according such management algorithm, the electronic control unit is also configured to actuate the electric motor so as to generate a torque on the steering shaft, oriented in an opposite direction of rotation with respect to that in which the user actuates the steering member.

11. Vehicle (1) comprising
the steering arrangement (10) according to claim 1,
a pair of steered wheels (5),
a rotation sensor (200,205,210) configured to measure a parameter indicative of a rotation angle of the steering shaft (60),
a steering sensor (215) configured to measure a parameter indicative of a steering angle of the steered wheels (5), wherein the electronic control unit (220) is operatively connected to the steering sensor (215) and to the rotation sensor (200,205,210) and is configured to actuate the flow-rate regulating device (125) as a function of a parameter indicative of an operating condition of the vehicle (1) and of the ratio between the angle of rotation of the steering shaft (60) and the steering angle of the steered wheels (5).

12. The vehicle (1) according to claim 11, wherein the electronic control unit (220) comprises a relationship algorithm such that each steering angle value of the steered wheels corresponds to a rotation angle value of the steering shaft, and is configured to compare the value of the parameter indicative of the steering angle of the steered wheels (5) with the value of the parameter indicative of a rotation angle of the steering shaft (60) and, when the comparison between such parameters returns a value that differs from the relationship values between angles defined by the relationship algorithm, is configured to actuate the flow-rate regulating device (125) so as to change the flow rate that flows in the amplification branch until the comparison of the value of the parameter indicative of the steering angle of the steered wheels (5) with the value of the parameter indicative of a rotation angle of the steering shaft (60) returns the value provided for by the relationship algorithm.

13. The vehicle (1) according to claim 11, wherein the electronic control unit (220) is configured to actuate the electric motor (185) so as to drive the vehicle (1) along a predetermined path and to actuate the flow-rate regulating device (125) so that the flow rate value in the amplification branch (120) is around the maximum flow rate value in the amplification branch (120), when the electronic control unit (220) actuates the electric motor (185) to drive the vehicle along the predetermined path.

\* \* \* \* \*